United States Patent
Wilber

(10) Patent No.: US 10,107,105 B2
(45) Date of Patent: Oct. 23, 2018

(54) FAN BLADE GROUNDING TAB

(71) Applicant: UNITED TECHNOLOGIES CORPORATION, Farmington, CT (US)

(72) Inventor: John E. Wilber, East Hampton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 768 days.

(21) Appl. No.: 14/735,770

(22) Filed: Jun. 10, 2015

(65) Prior Publication Data

US 2016/0047247 A1 Feb. 18, 2016

Related U.S. Application Data

(60) Provisional application No. 62/010,549, filed on Jun. 11, 2014.

(51) Int. Cl.
| | |
|---|---|
| *F02C 3/04* | (2006.01) |
| *F01D 5/14* | (2006.01) |
| *F01D 5/30* | (2006.01) |
| *F01D 5/28* | (2006.01) |

(52) U.S. Cl.
CPC .............. *F01D 5/147* (2013.01); *F01D 5/28* (2013.01); *F01D 5/3007* (2013.01); *F02C 3/04* (2013.01); *F05D 2240/303* (2013.01)

(58) Field of Classification Search
USPC .... 60/805, 806, 39.091, 226.1; 416/62, 224, 416/219 R, 229 A, 248, 220 R, 239
See application file for complete search history.

(56) References Cited

U.S. PATENT DOCUMENTS

| | | | | | |
|---|---|---|---|---|---|
| 6,004,101 | A | * | 12/1999 | Schilling | F01D 5/28 416/219 R |
| 8,376,712 | B2 | * | 2/2013 | Klinetob | F01D 5/147 416/224 |
| 8,876,482 | B2 | * | 11/2014 | Murdock | F01D 5/28 244/1 A |
| 9,322,283 | B2 | * | 4/2016 | Parkin | F01D 5/28 |
| 9,376,924 | B2 | * | 6/2016 | Murdock | F01D 5/147 |
| 9,617,860 | B2 | * | 4/2017 | Lattanzio | F01D 5/3007 |
| 9,650,897 | B2 | * | 5/2017 | Deal | F01D 5/147 |

FOREIGN PATENT DOCUMENTS

EP 2604794 6/2013

OTHER PUBLICATIONS

International Search Report, International Application No./Patent No. 15171738.6-1610, dated Oct. 21, 2015, European Patent Office; International Search Report 6 pages.

* cited by examiner

*Primary Examiner* — Binh Q Tran
(74) *Attorney, Agent, or Firm* — Cantor Colburn LLP

(57) ABSTRACT

An airfoil for a gas turbine engine is disclosed. The airfoil may include a leading edge, a sheath on the leading edge; and a grounding element connected to the sheath. The grounding element may have a radially extending tab, and may be configured for connection to a component of the gas turbine engine to form a ground path from the sheath to the component.

19 Claims, 24 Drawing Sheets

FAN BLADE GROUNDING TAB

CROSS-REFERENCE TO RELATED APPLICATION

This Application is a non-provisional patent application claiming priority under 35 U.S.C. § 119(e) to U.S. Provisional Patent Application Ser. No. 62/010,549 filed on Jun. 11, 2014.

FIELD OF THE DISCLOSURE

The present disclosure relates generally to gas turbine engines and, more particularly, to airfoils in a gas turbine engine.

BACKGROUND OF THE DISCLOSURE

Gas turbine engines may typically include a fan, a compressor, a combustor, and a turbine, with an annular flow path extending axially through each. Initially, the fan, which is powered by the turbine, draws ambient air into the engine. Part of the air flows through the compressor where it is compressed or pressurized. The combustor then mixes and ignites the compressed air with fuel, generating hot combustion gases. These hot combustion gases are then directed from the combustor to the turbine where power is extracted from the hot gases by causing blades of the turbine to rotate. The other part of the airflow from the fan is used to generate forward thrust.

Due to the large volume of air moving across the fan blades, static electric charge may build up. With fan blades composed of a conductive metal that was grounded to a hub, the static charge would dissipate. Recently, however, fan blades have been composed of aluminum in order to increase a size, but not a weight, of the blades. A titanium sheath may cover a leading edge of the fan blade, while a grounding element made of like material may be positioned on a platform and a root of the fan blade in order to from a ground path to dissipate the static charge buildup.

However, in a saltwater environment (or other corrosive environment), a crevice between the sheath and the grounding element may retain saltwater particles (or other electrolyte particles). As a result, the ground path may be broken and galvanic corrosion may occur, thereby leading to an erosion of the leading edge and aluminum body. Accordingly, there exists a need for an improved configuration that provides a solid and reinforced ground path for the fan blades of a gas turbine engine.

SUMMARY OF THE DISCLOSURE

According to one embodiment, an airfoil for a gas turbine engine is disclosed. The airfoil may comprise a leading edge, a sheath on the leading edge; and a grounding element connected to the sheath. The grounding element may have a radially extending tab, and may be configured for connection to a component of the gas turbine engine to form a ground path from the sheath to the component.

In a refinement, the airfoil may further comprise a collar overlapping the sheath and the tab of the grounding element.

In another refinement, the tab may be preloaded toward the collar.

In another refinement, the sheath may overlap the tab of the grounding element.

In another refinement, the airfoil may further comprise a first side and an opposite second side extending radially outward from a platform to a tip; and a root extending radially inward from the platform, the grounding element being disposed on the platform and extending radially inward from the platform to the root, the tab projecting radially outward from the platform.

In another refinement, the grounding element may include a platform cover disposed on a leading edge of the platform, and a strip extending from the platform cover to the root.

In another refinement, the root may include a gradual bend from an under side of the platform to the root in order to enhance manufacturability of the strip.

In another refinement, the strip may extend along a length of a leading edge of the root.

In another refinement, the platform cover and the strip may comprise a multi-piece configuration.

In another refinement, the platform cover may include a slot configured to receive an end of the strip.

In another refinement, the platform may include a slot configured to receive an end of the strip.

In another refinement, the grounding element may further include a dovetail cap extending from the strip and sized to cover a dovetail portion of a leading edge of the root.

In another refinement, the dovetail portion of the leading edge of the root is shaped to fit within the dovetail cap.

In another refinement, the platform cover, the strip, and the dovetail cap may comprise a three-piece configuration.

In another refinement, the strip may include a multi-piece configuration including a first piece extending from the leading edge of the platform to an under side of the platform, and a second piece extending from the under side of the platform to the root.

In another refinement, the platform cover may include a multi-piece configuration including a first piece extending circumferentially from a first side of the platform proximate to a centerline of the platform, and a second piece extending circumferentially proximate the centerline of the platform to a second side of the platform.

According to another embodiment, an assembly for a gas turbine engine is disclosed. The assembly may comprise a fan section; a compressor section downstream of the fan section; a combustor section downstream of the compressor section; and a turbine section downstream of the combustor section. At least one of the fan section, the compressor section, and the turbine section may have an airfoil including a sheath disposed on a leading edge of the airfoil, and a grounding element disposed on a platform of the airfoil and extending radially inward from the platform to a root of the airfoil. The grounding element may include a tab projecting radially outward from the platform. The grounding element and the sheath may be connected to form a ground path from the sheath to a rotor in the at least one of the fan section, the compressor section, and the turbine section.

In a refinement, a collar may connect the grounding element to the sheath.

According to yet another embodiment, a method for increasing a connectivity between a sheath and a grounding element of an airfoil is disclosed. The method may comprise connecting the sheath of the airfoil to a tab on the grounding element of the airfoil, the tab projecting radially outward from a platform of the airfoil to a predetermined height along a side of the airfoil.

In a refinement, the method may further comprise adhering the sheath on top of the tab.

These and other aspects and features of the disclosure will become more readily apparent upon reading the following detailed description when taken in conjunction with the accompanying drawings. Although various features are disclosed in relation to specific exemplary embodiments of the invention, it is understood that the various features may be combined with each other, or used alone, with any of the various exemplary embodiments of the invention without departing from the scope of the invention.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents falling within the spirit and scope of the present disclosure.

DETAILED DESCRIPTION

Figure 1:
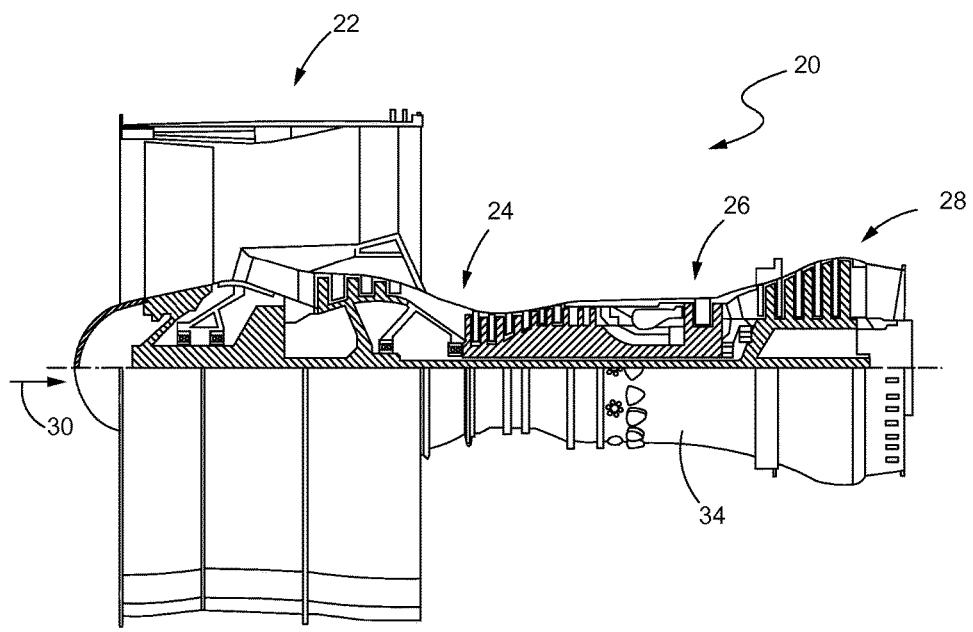
FIG. 1 is a cross-sectional view of a gas turbine engine, according to an embodiment of the present disclosure.

Referring now to the drawings, and with specific reference to FIG. 1, in accordance with the teachings of the disclosure, an exemplary gas turbine engine 20 is shown. The gas turbine engine 20 may generally comprise a fan section 22 which draws ambient air into the engine 20, a compressor section 24 where air is pressurized, a combustor 26 downstream of the compressor section which mixes and ignites the compressed air with fuel and thereby generates hot combustion gases, a turbine section 28 downstream of the combustor 26 for extracting power from the hot combustion gases, and an annular flow path 30 extending axially through each. Gas turbine engine 20 may be used on an aircraft for generating thrust or power, or in land-based operations for generating power as well.

Figure 2:
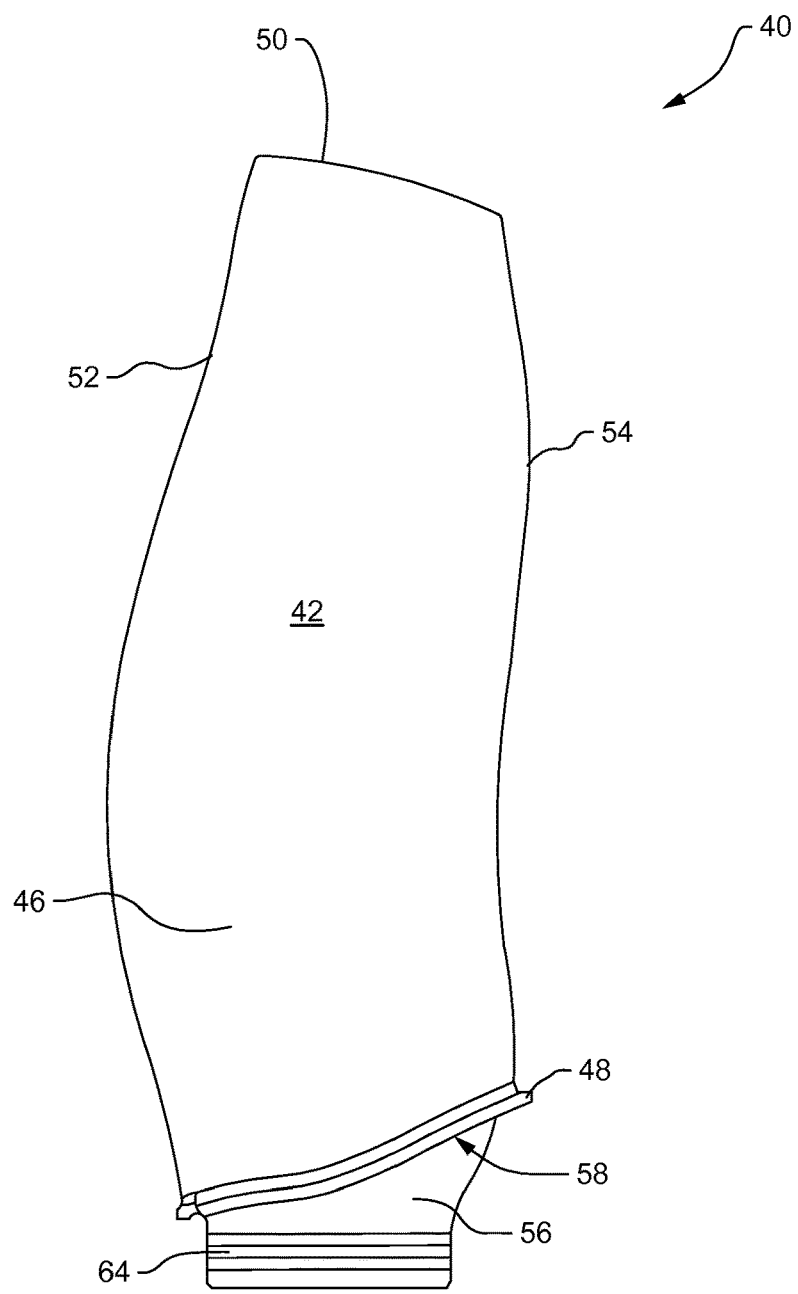
FIG. 2 is a side view of a first side of an airfoil in the gas turbine engine of FIG. 1.
Figure 3:
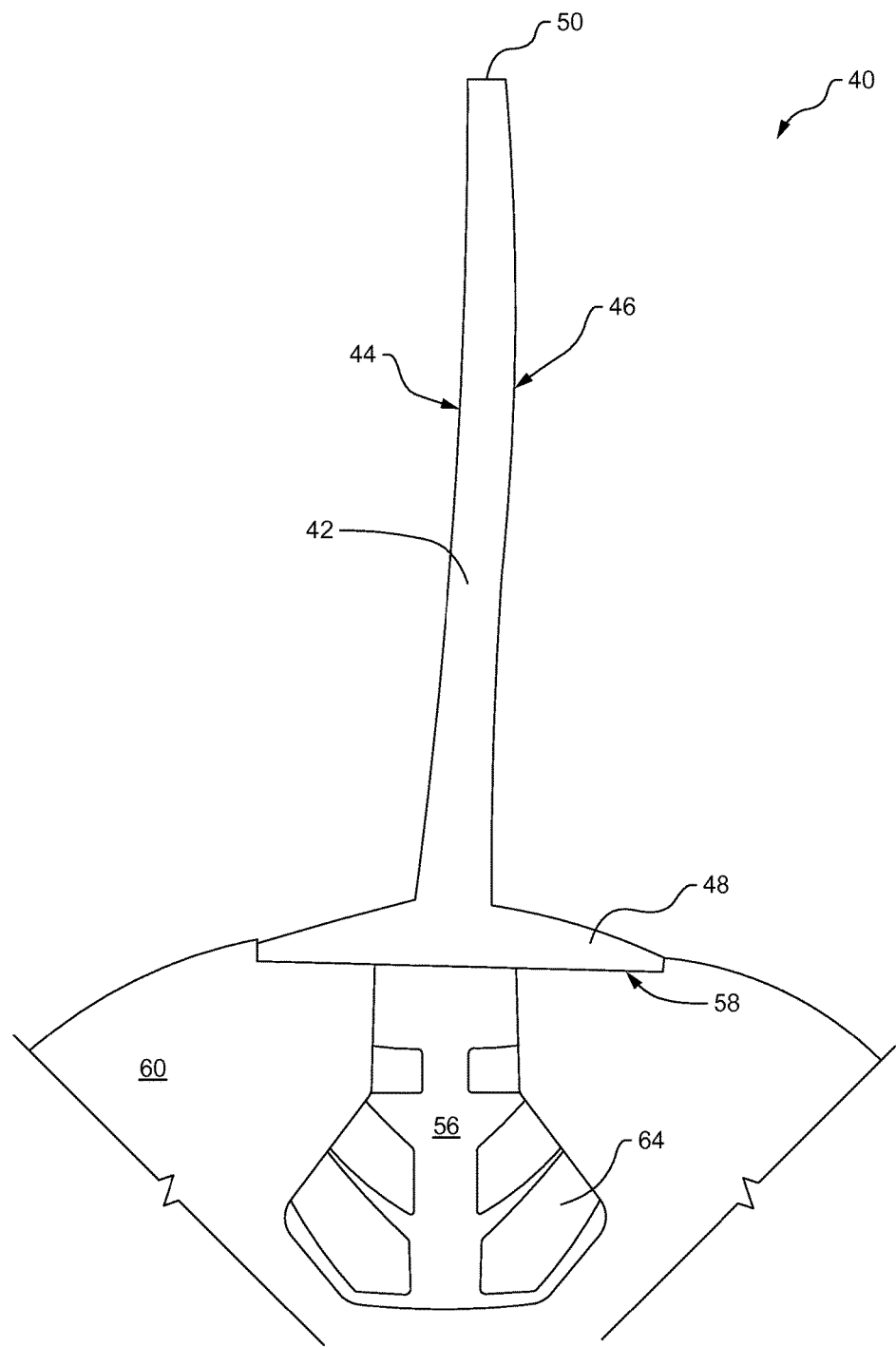
FIG. 3 is a front view of the airfoil of FIG. 2 within a rotor of the gas turbine engine.
Figure 4:
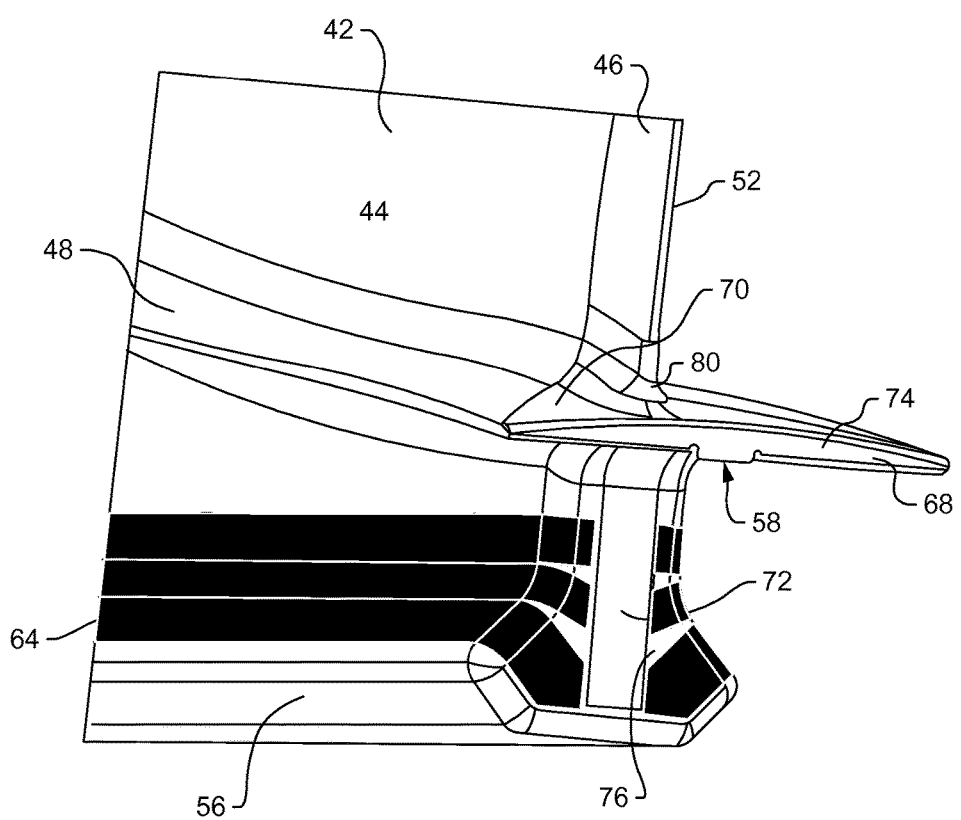
FIG. 4 is a perspective view of a portion of the airfoil of FIG. 2 with a sheath, a grounding element, and a collar, according to another embodiment of the present disclosure.
Figure 5:
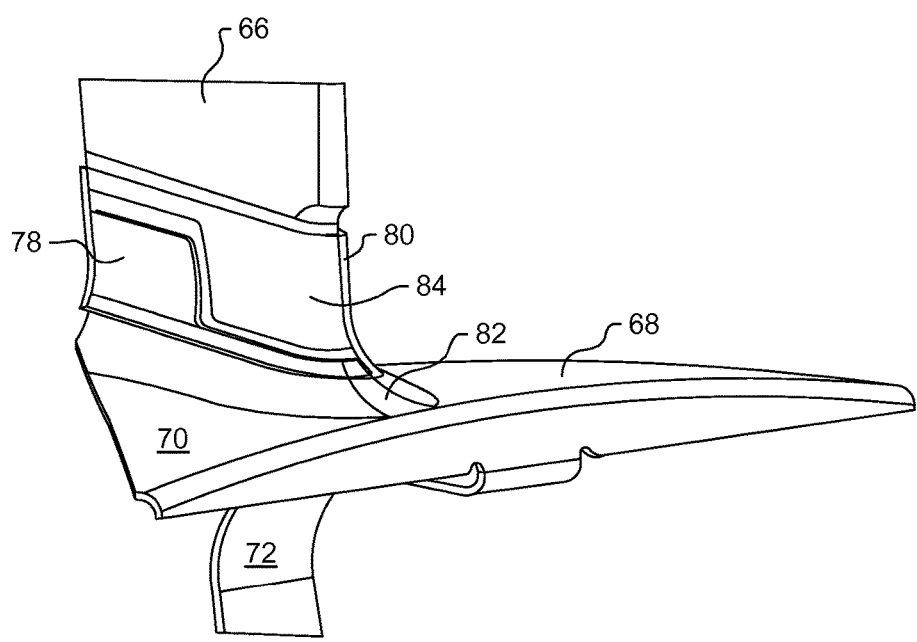
FIGS. 5 and 6 are perspective views of the sheath, the grounding element, and the collar of FIG. 4.

Turning now to FIGS. 2 and 3, with continued reference to FIG. 1, an airfoil 40 of the gas turbine engine 20 is shown. The airfoil 40 may comprise a fan blade in the fan section 22, or a rotor blade or stator vane in the compressor section 24 or turbine section 28 of the gas turbine engine 20. Airfoil 40 may comprise a body 42 that includes a first side 44 and an opposite second side 46 projecting radially outward from a platform 48 to a tip 50. The first and second sides 44, 46 may extend axially from a leading edge 52 to a trailing edge 54 (downstream of the leading edge 52).

The airfoil 40 may also include a root 56 extending from an under side 58 of the platform 48. The airfoil 40 may be installed or positioned within a rotor 60 of the engine 20. For example, the root 56 may be shaped to fit within a groove 62 of the rotor 60. Although other materials are certainly possible, the body 42, platform 48, and root 56 of the airfoil 40 may be composed of aluminum or various aluminum alloys. In addition, protective coatings, such as polyurethane and the like, may be applied to the airfoil 40. The airfoil 40 may be solid, hollow, or a combination thereof. For example, the airfoil 40 may include channels, pockets, and filler materials (not shown). Furthermore, fabric wear pads 64 may be placed on the root 56 of the airfoil 40.

As shown best in FIGS. 4-10, with continued reference to FIGS. 1-3, a sheath 66 may be secured to the leading edge 52 of the body 42 of the airfoil 40. For example, the sheath 66 may be bonded to the body 42, such as, via a conductive bonding agent or other adhesive. The sheath 66 may cover the leading edge 52 proximate the platform 48 and extend to the tip 50 (FIG. 2). The sheath 66 may strengthen the airfoil 40 against foreign object damage. Although other materials are certainly possible, the sheath 66 may be composed of titanium or various titanium alloys.

The airfoil 40 may further include a grounding element 68 that provides a ground path from the sheath 66 to the rotor 60 (FIG. 3) in order to dissipate static electric charge buildup. The grounding element 68 may be secured on the platform 48 and the root 56 of the airfoil 40, such as, via a conductive bonding agent or other adhesive. More specifically, the grounding element 68 may include a platform cover 70 and a strip 72. The platform cover 70 may extend over a leading edge 74 of the platform 48, and the strip 72 may extend from the platform cover 70 radially inward to the root 56 of the airfoil 40. The strip 72 may extend along the under side 58 of the platform 48 of the airfoil 40 to a leading edge 76 of the root 56. Although other materials are certainly possible, the grounding element 68 may be composed of a similar material as the sheath 66, such as, titanium or various titanium alloys.

Figure 6:
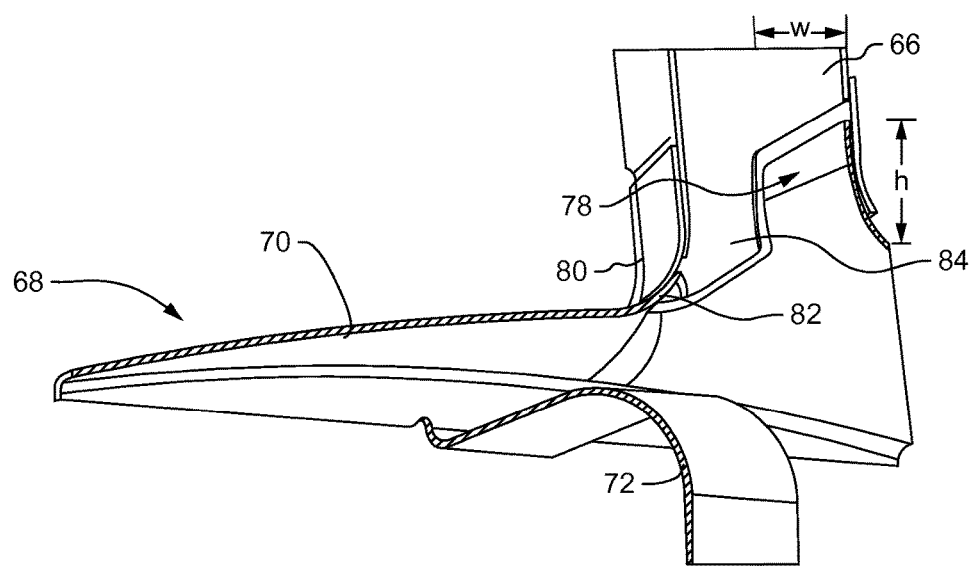
Figure 7:
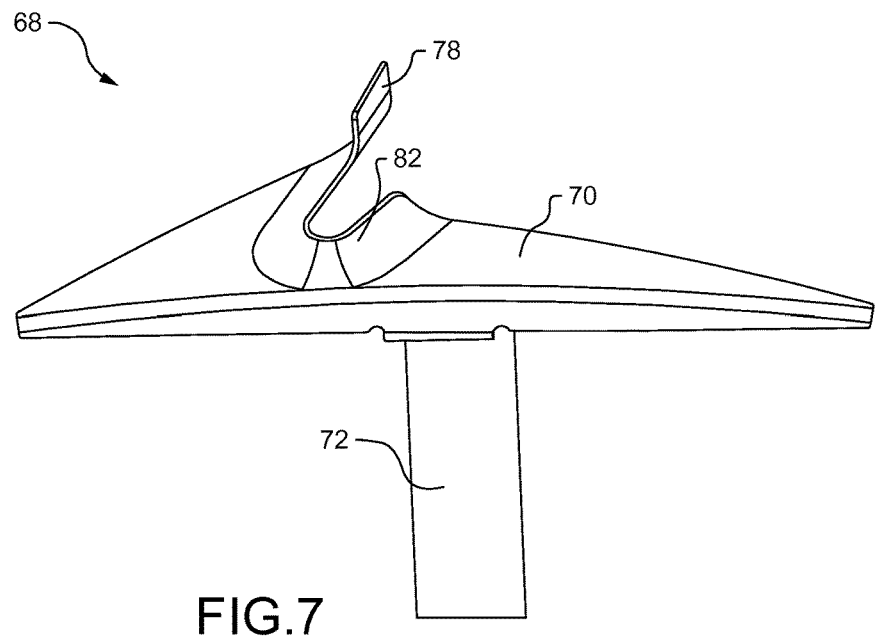
FIGS. 7 and 8 are perspective views of the grounding element of FIG. 4.
Figure 8:
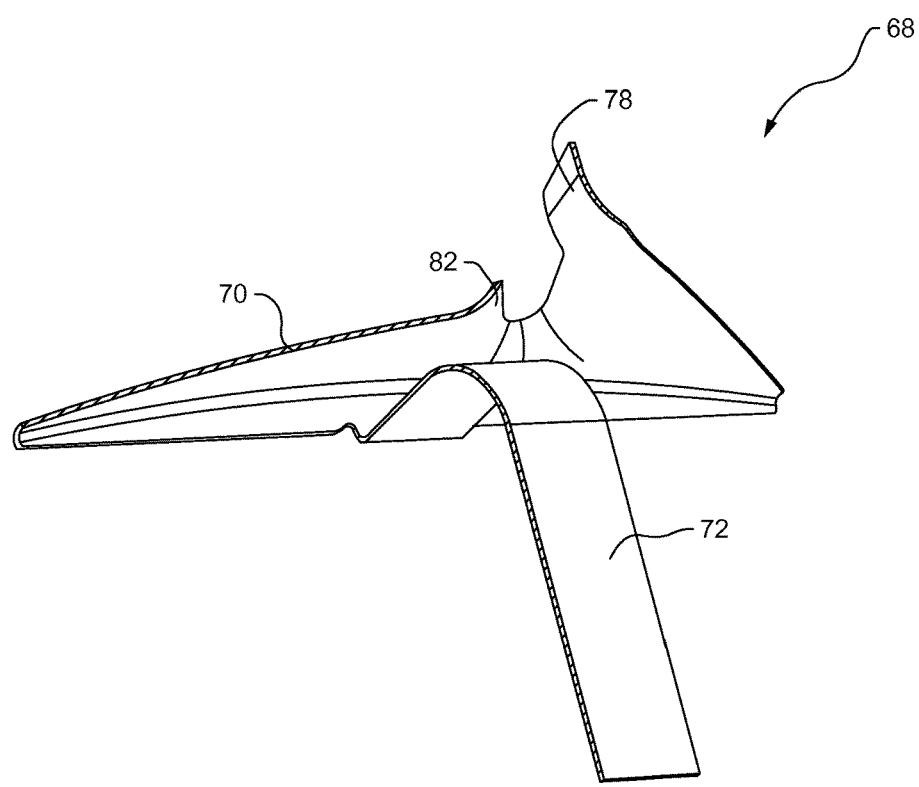
Figure 9:
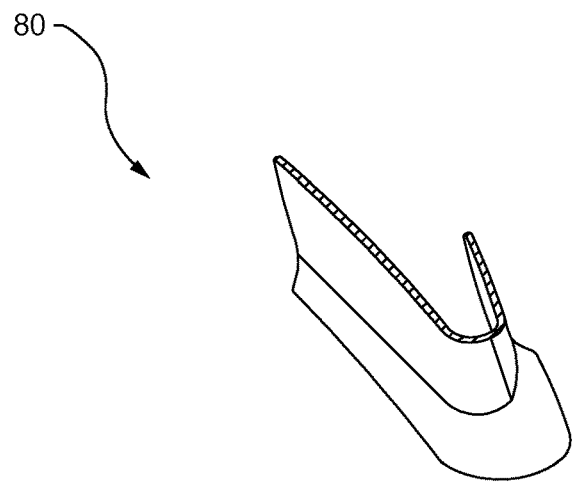
FIGS. 9 and 10 are perspective views of the collar of FIG. 4.
Figure 10:
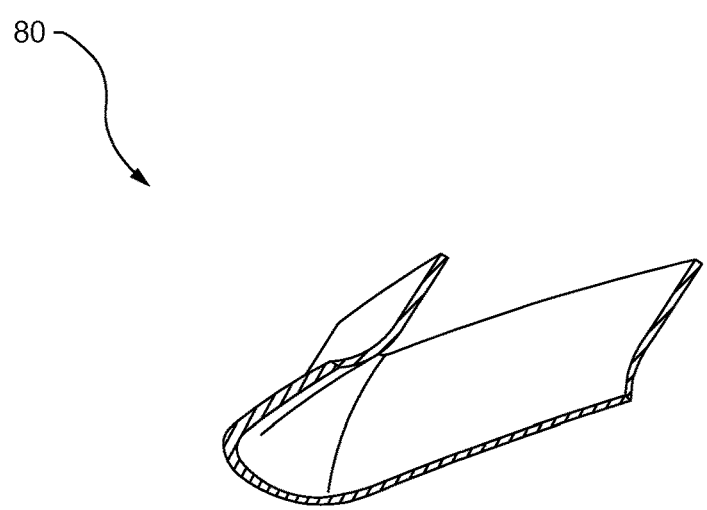

To provide a reinforced ground path, the grounding element 68 may include a tab 78 (FIGS. 5-8) projecting radially outward from the platform cover 70. The tab 78 may extend along the first side 44 of the airfoil 40 to a predetermined height h (FIG. 6). For example purposes only, the predetermined height h may be approximately 0.5 inch, although other heights are certainly possible. An example width w (FIG. 6) of the tab 78 may be approximately 0.5 inch, although other widths are certainly possible. Although not shown, the tab 78 may also extend along the second side 46, leading edge 52, or around both sides 44, 46 and the leading edge 52 of the body 42 of the airfoil 40. Furthermore, it is certainly possible for the grounding element 68 to have more than one tab 78.

A collar 80 (FIGS. 9 and 10) may be secured around the sheath 66 and the grounding element 68 to ensure conductivity between the sheath 66 and the grounding element 68 and fortify the ground path. For example, the collar 80 may overlap the tab 78, an edge 82 (FIGS. 5-8) of the grounding element 68, and an end 84 (FIGS. 5 and 6) of the sheath 66. The collar 80 may be bonded to the grounding element 68 (e.g., to the tab 78 and edge 82), sheath 66, and body 42 of the airfoil 40 via a conductive bonding agent or other adhesive.

The tab 78 of the grounding element 68 may be preloaded or biased toward the collar 80 to enhance contact and ensure conductivity between components. For example, the tab 78 may be over-bent or bent towards the collar 80 in a forming process. In addition, the tab 78 may not be bonded to the body 42 of the airfoil 40 to allow a spring effect with the collar 80. However, if desired, it is certainly possible to bond the tab 78 to the body 42.

Although other materials are certainly possible, the collar 80 may be composed of a similar material as the sheath 66 and the grounding element 68, such as, titanium or various titanium alloys. The collar may have a height of approximately 0.75 inch, although other heights are certainly possible. In addition, each of the sheath 66, grounding element 68, and collar 80 may have an approximate thickness within an inclusive range of 0.025 inch to 0.030 inch, although other thicknesses are certainly possible.

Figure 11:
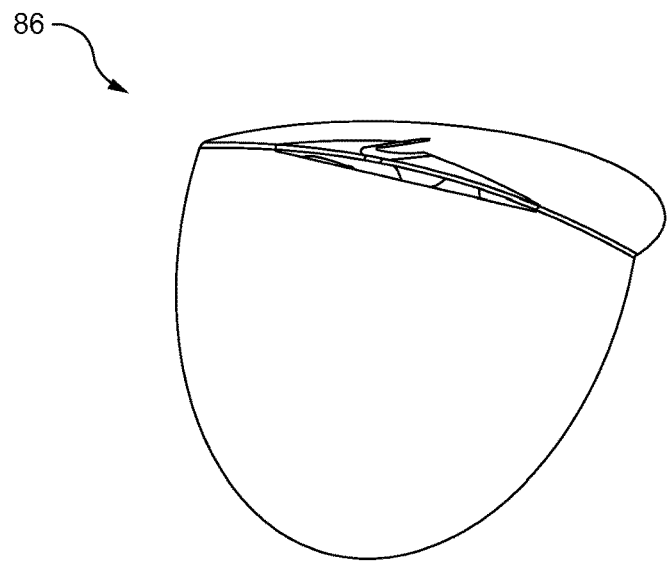
FIG. 11 is a perspective view of a piece of sheet metal used to make the grounding element of FIG. 4.
Figure 12:
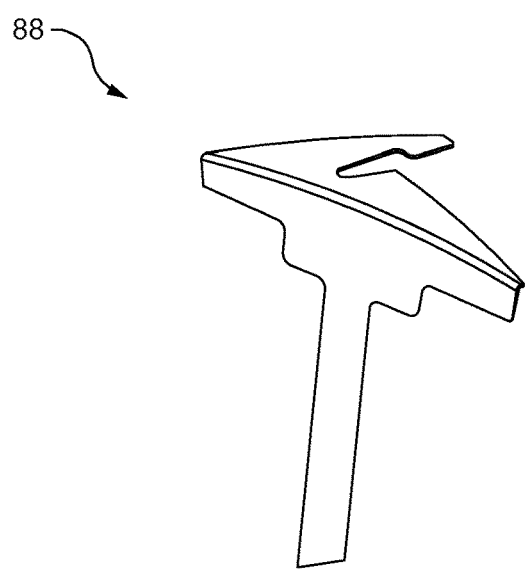
FIG. 12 is a perspective view of a pattern for the grounding element of FIG. 4 cut from the piece of sheet metal of FIG. 11.

Referring now to FIGS. 11 and 12, with continued reference to FIGS. 1-10, the grounding element 68 may be made through a serious of various processes. For example, a piece of sheet metal 86 (FIG. 11) may be bent, such as, via hot forming. Other processes, such as, die forming or hydroforming, may certainly be used. A pattern 88 (FIG. 12) of the grounding element 68 may be cut from the piece of bent sheet metal 86, such as, via a five axis laser or other cutting method. The cut pattern 88 may then go through hot forming (or other processes) in order to mold the grounding element 68 into a shape that fits around the airfoil 40 and provides for strong adhesion between the grounding element 68 and airfoil 40. More specifically, the edge 82 (FIGS. 5-8) and the tab 78 may be bent or formed to a contour of the body 42 of the airfoil 40, and the strip 72 may be bent or formed to a contour of the under side 58 of the platform 48 and the root 56 of the airfoil 40. The sheath 66 and the collar 80 may be formed via similar processes as the grounding element 68.

Figure 13:
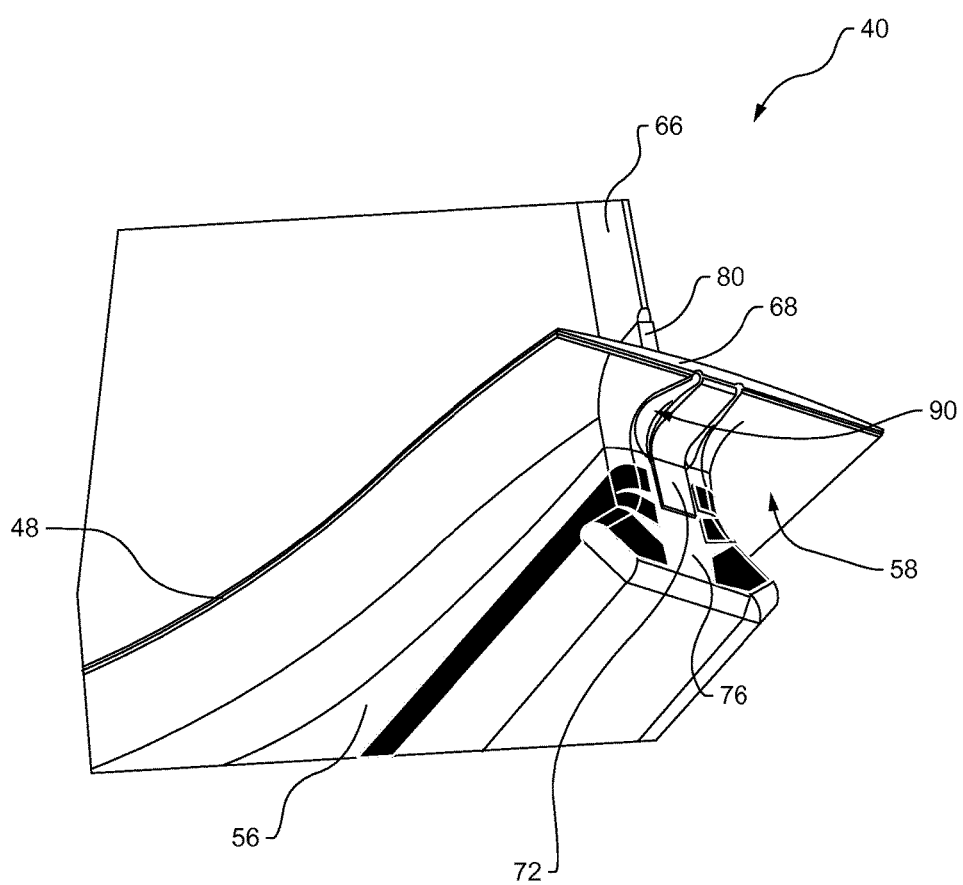
FIG. 13 is a perspective view of a portion of an airfoil with a gradual bend on an under side of a platform, according to another embodiment.

Turning now to FIG. 13, with continued reference to FIGS. 1-12, the root 56 of the airfoil 40 may be configured to enhance manufacturability of the grounding element 68. For example, the root 56 may include a gradual bend 90 from the under side 58 of the platform 48 to the leading edge 76 of the root 56. Compared to prior art airfoils, there may be more material between the under side 58 of the platform 48 and the leading edge 76 of the root 56 such that there is a less acute angle at the gradual bend 90. In so doing, when the grounding element 68 is formed, the strip 72 does not have to be bent in an acute angle in order to conform with a contour of the airfoil 40, thereby enabling an ease of manufacturability of the strip 72 and adhesion to the bend 90 on the under side 58 of the platform 48.

Figure 14:
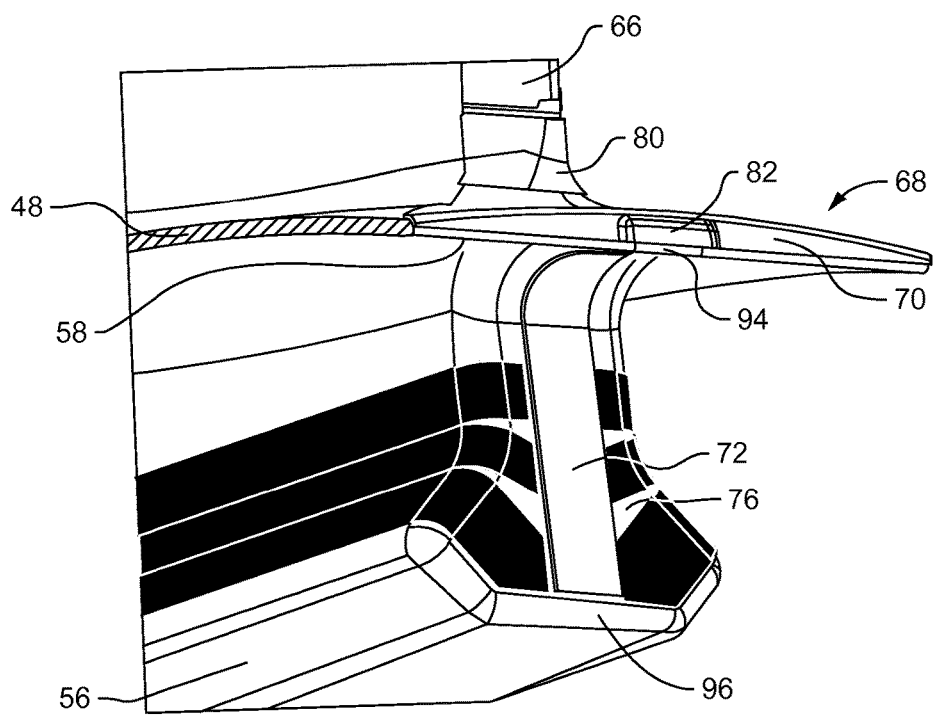
FIG. 14 is a perspective view of a portion of an airfoil with a sheath, a collar, and a multi-piece configuration for the grounding element, according to another embodiment.
Figure 15:
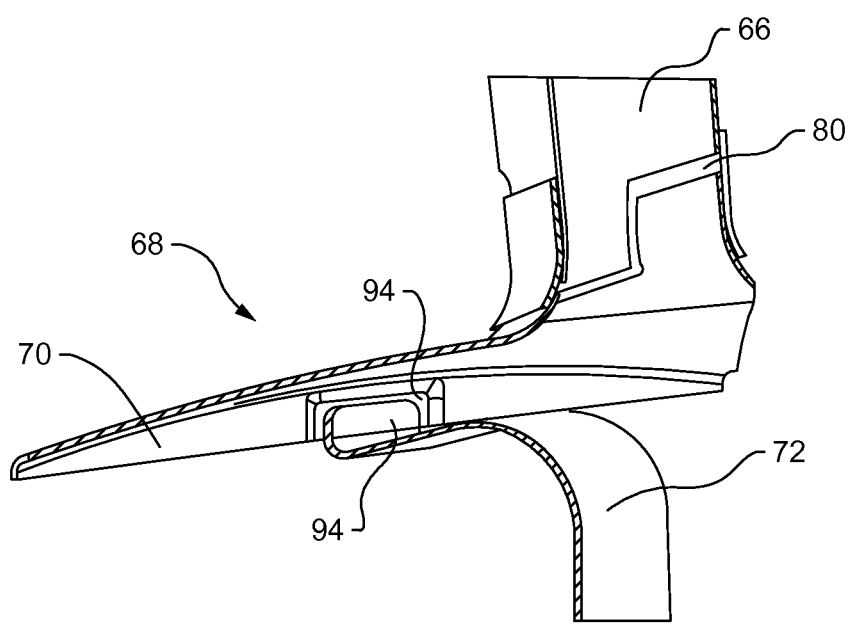
FIG. 15 is a perspective view of the sheath, the collar, and the multi-piece grounding element of FIG. 14.
Figure 16:
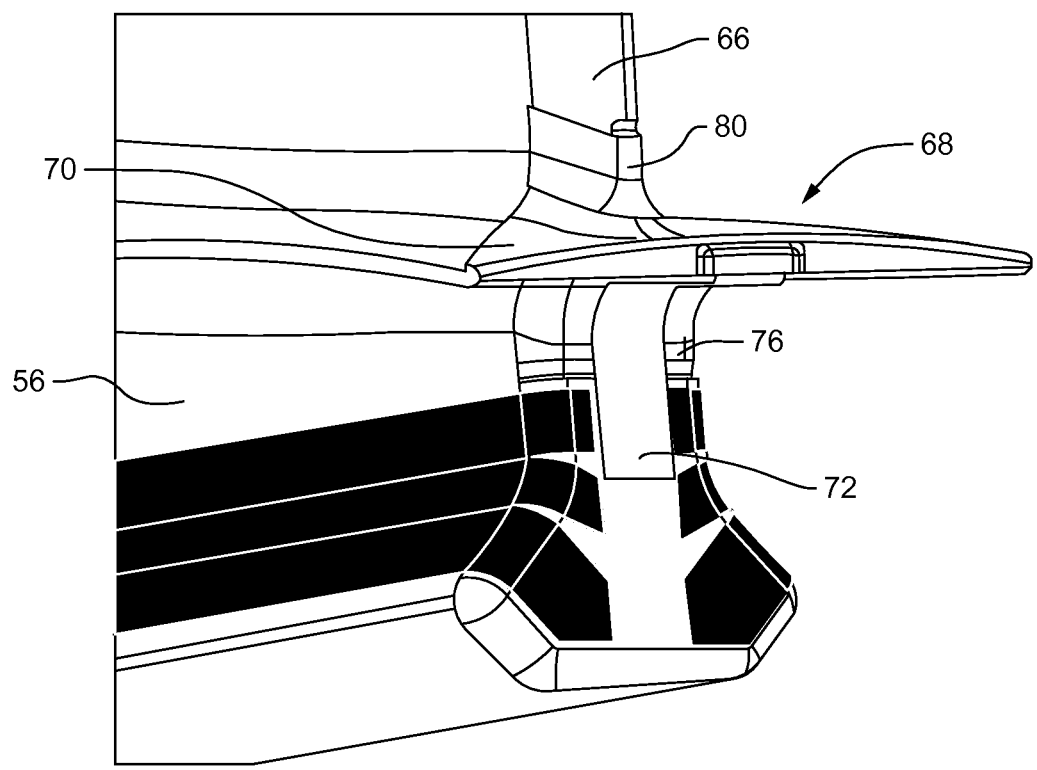
FIGS. 16-18 are perspective views of a grounding element with a dovetail cap, according to another embodiment.
Figure 17:
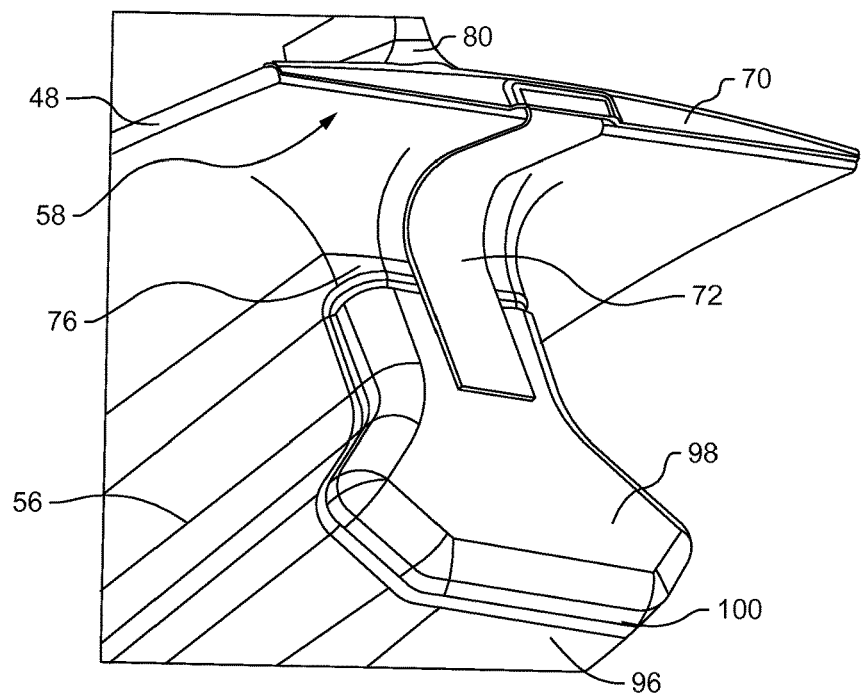
Figure 18:
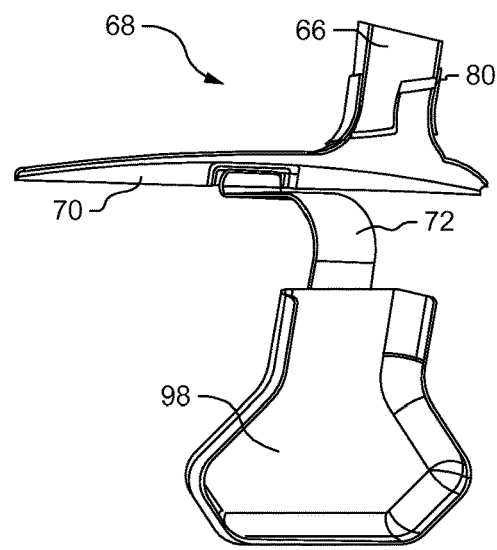
Figure 19:
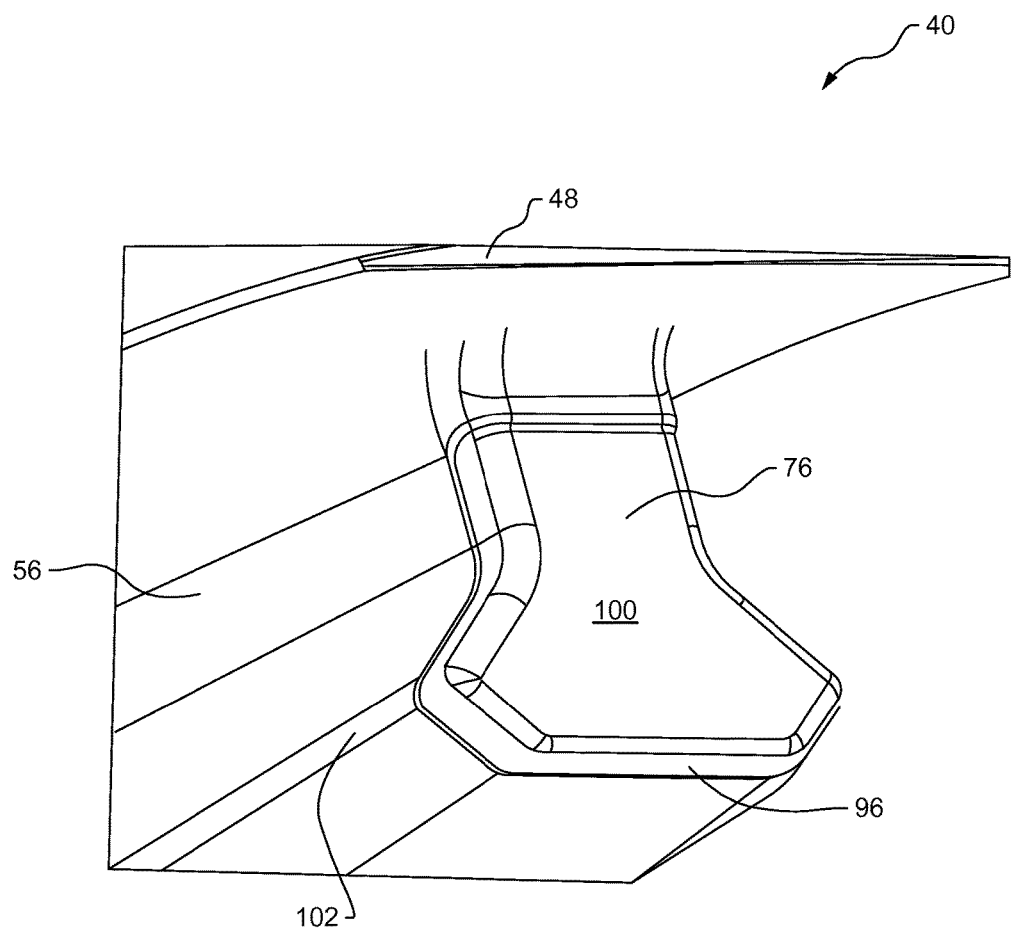
FIG. 19 is a perspective view of an airfoil shaped to fit the dovetail cap of FIGS. 16-18.

Referring now to FIGS. 14 and 15, with continued reference to FIGS. 1-13, the grounding element 68 may comprise a multi-piece configuration. For example, the platform cover 70 and the strip 72 may be two separate pieces, as opposed to the platform cover 70 and the strip 72 being integrated into one piece. In addition, the platform cover 70 may include a slot 92 configured to receive an end 94 of the strip 72. The strip 72 may extend proximate to a bottom 96 of the leading edge 76 of the root 56 and may be substantially rectangular in shape, although other shapes are certainly possible. With a multi-piece configuration, a bending of the strip 72 during manufacture to match an angle of the underside 58 of the platform 48 and the leading edge 76 of the root 56 may be less difficult. There may also be improved sealing and alignment when the parts are assembled, thereby eliminating tolerance issues and minimizing galvanic corrosion.

Turning now to FIGS. 16-19, with continued reference to FIGS. 1-15, the grounding element 68 may also include a dovetail cap 98. The dovetail cap 98 may be a separate piece from the platform cover 70 and the strip 72 and may be sized to cover a dovetail portion 100 of the leading edge 76 of the root 56. In addition, the dovetail portion 100 of the leading edge 76 of the root 56 may be shaped to fit within the dovetail cap 98. As shown best in FIG. 19, the dovetail portion 100 of the leading edge 76 may be machined such that it has a reduced volume than a rest 102 of the root 56, and the dovetail cap 98 (FIGS. 16-18) may be attached without adding extra weight or volume to the airfoil 40.

In addition, the dovetail cap 98 may be secured to the dovetail portion 100 of the leading edge 76 of the root 56, such as, via a conductive bonding agent or other adhesive. The strip 72 may be bonded over the dovetail cap 98 and may not extend proximate to the bottom 96 of the root 56. However, other configurations are certainly possible. Although other materials are possible, the dovetail cap 98 may be composed of a similar material as the sheath 66, platform cover 70, and strip 72, such as, titanium or various titanium allows. The dovetail cap 98 may be formed via hot forming or other suitable processes.

Figure 20:
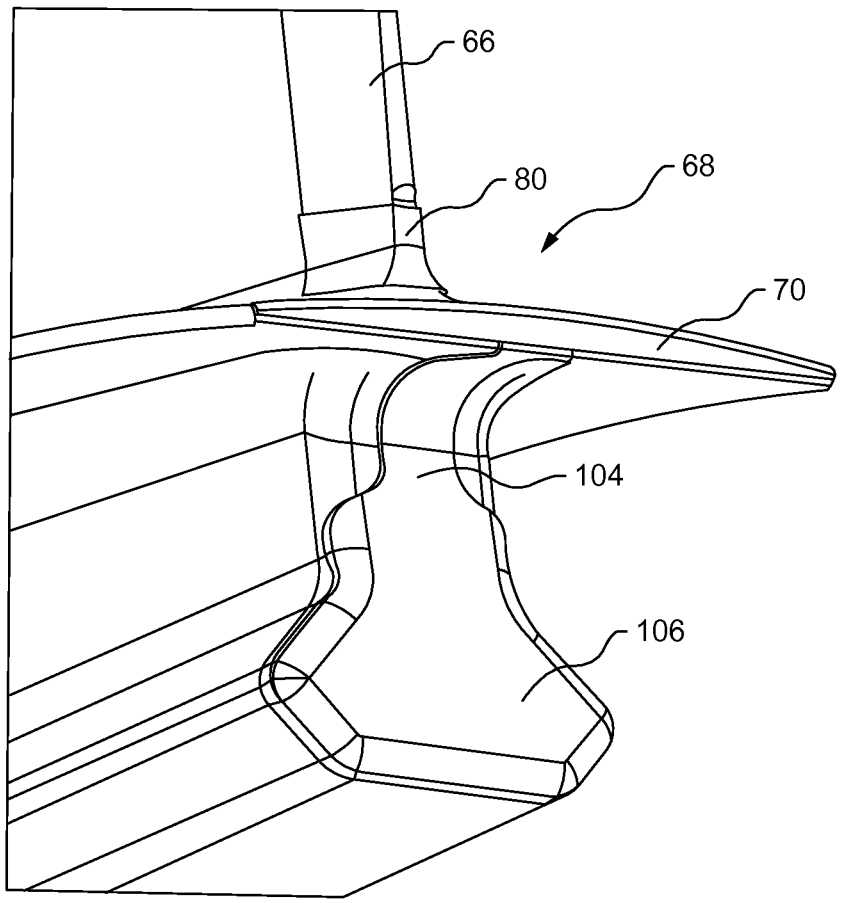
FIG. 20 is a perspective view of a grounding element with a strip and a dovetail cap integrated into one piece, according to another embodiment.

By including the dovetail cap 98, there may be a greater bonding area for the grounding element 68, and therefore, a stronger bond to the airfoil 40. In so doing, there may be improved sealing and assembly, thereby minimizing galvanic corrosion. Furthermore, although shown as two separate pieces, the strip 72 and dovetail cap 98 may be one integral piece. For example, as shown best in FIG. 20, a strip 104 of the grounding element 68 may have an integrated dovetail cap portion 106.

Figure 21:
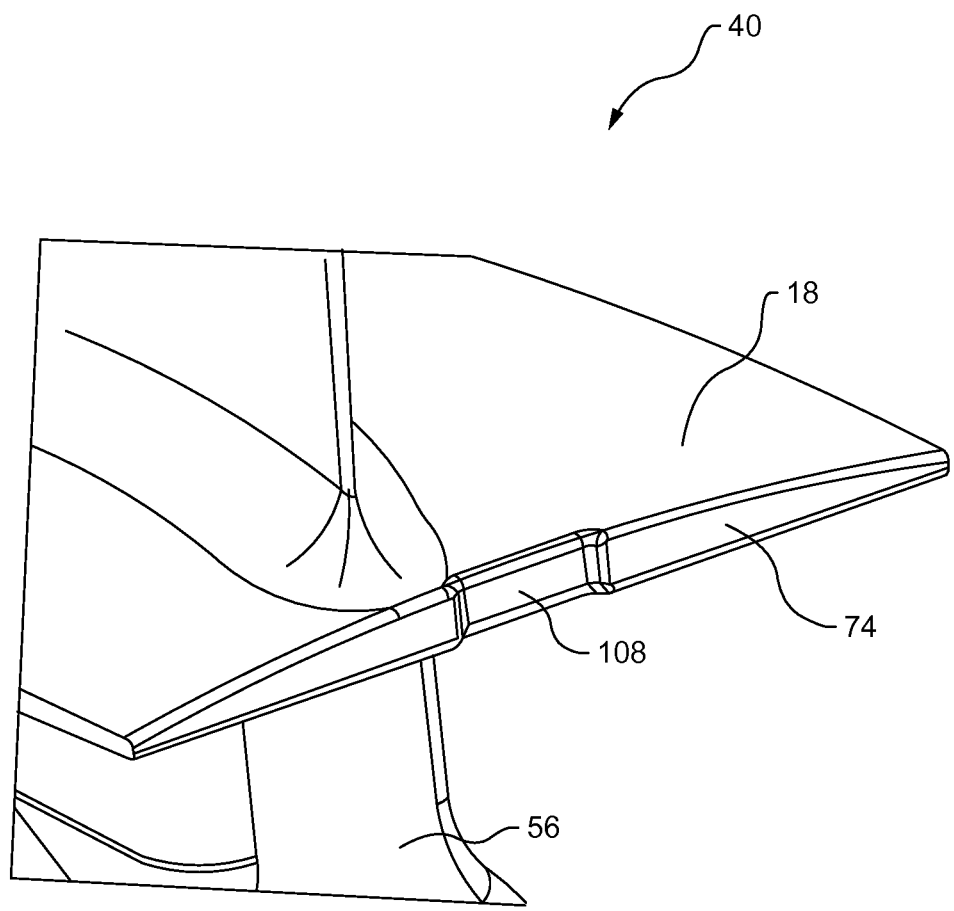
FIG. 21 is a perspective view of a portion of an airfoil with a slot to accommodate an end of a strip of a grounding element, according to another embodiment.
Figure 22:
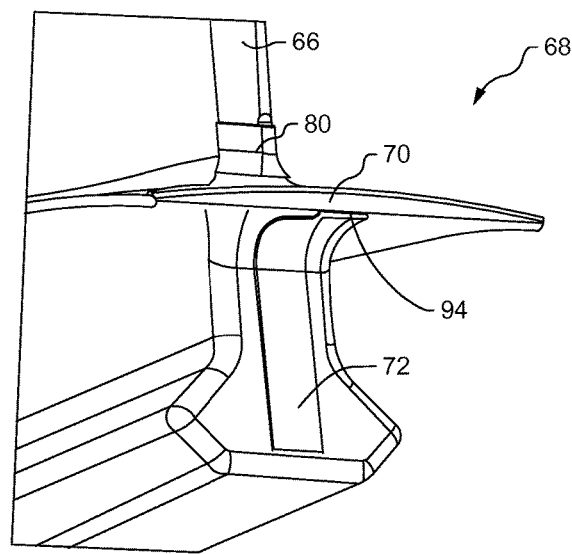
FIG. 22 is a perspective view of the airfoil of FIG. 21 with a sheath, a collar, and a grounding element.
Figure 23:
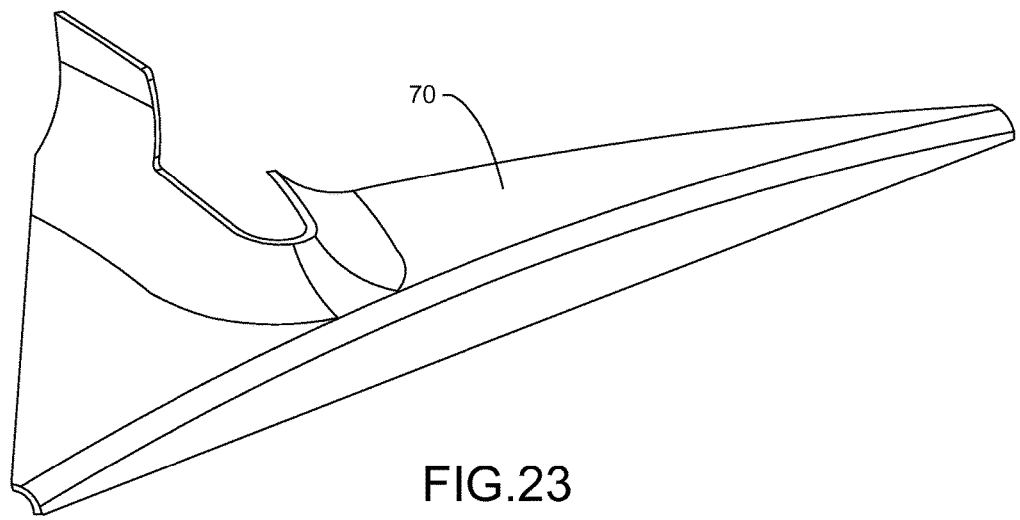
FIG. 23 is a perspective view of a platform cover of the grounding element of FIG. 22.
Figure 24:
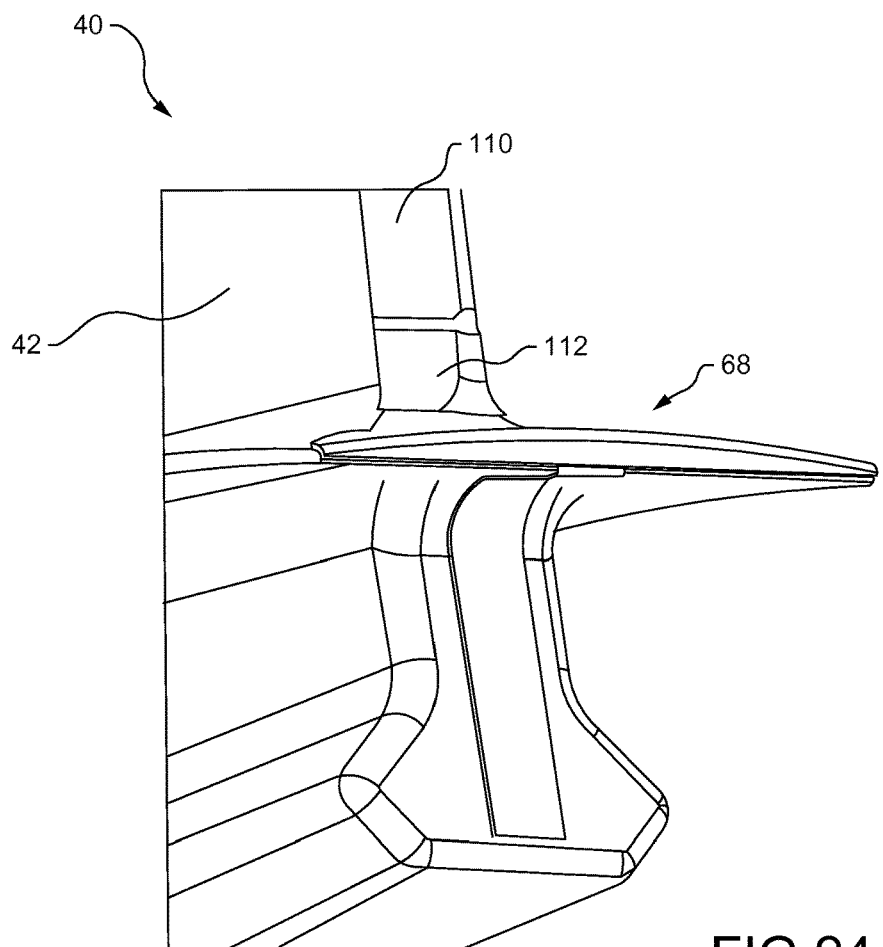
FIG. 24 is a perspective view of a portion of an airfoil with a sheath and a grounding element, according to another embodiment.
Figure 25:
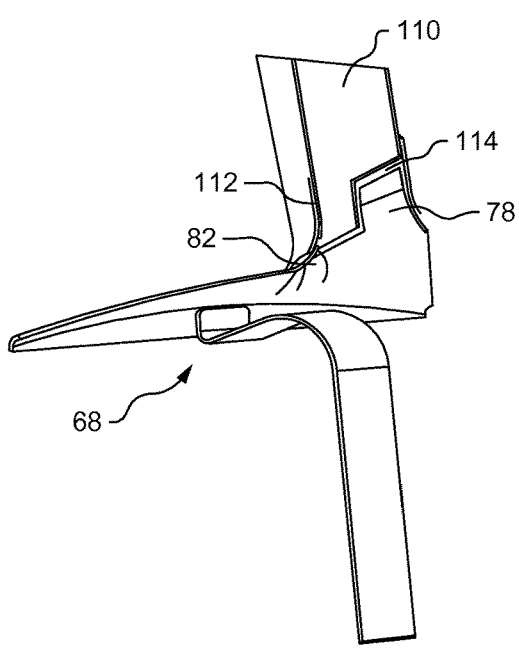
FIG. 25 is a perspective view of the sheath and the grounding element of FIG. 24.
Figure 26:
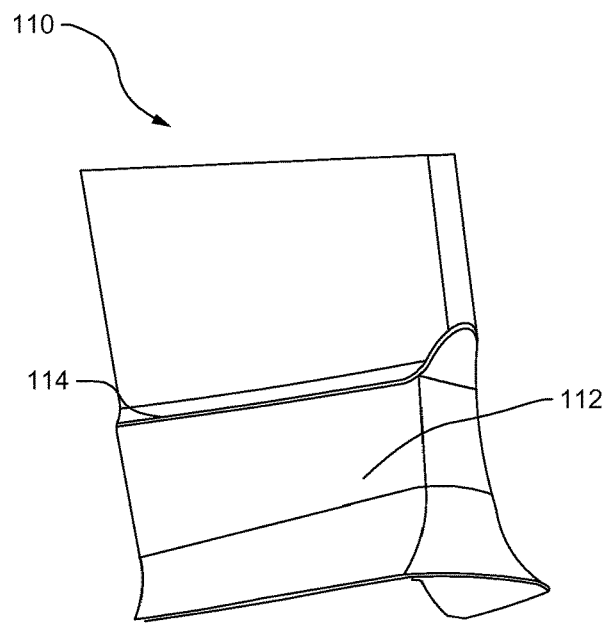
FIGS. 26 and 27 are perspective views of the sheath of FIG. 24.
Figure 27:
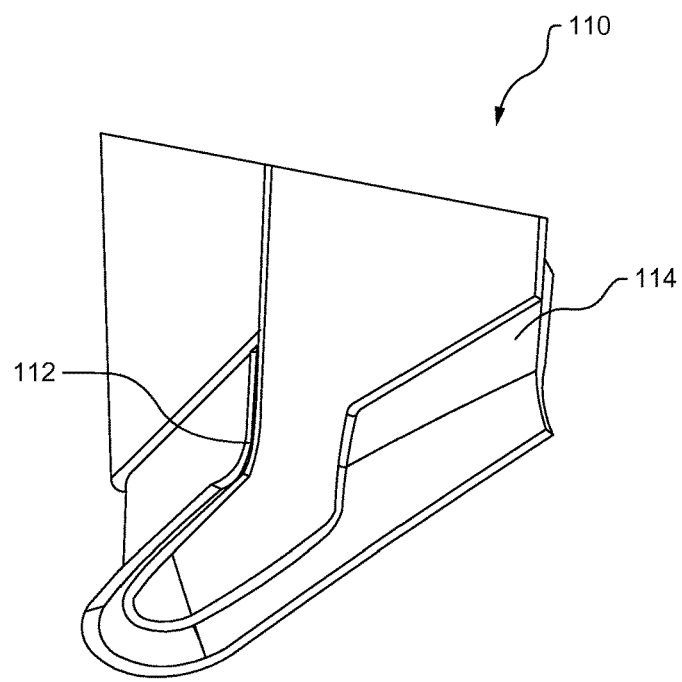

Referring now to FIGS. 21-23, with continued reference to FIGS. 1-20, the leading edge 74 of the platform 48 may include a slot 108 configured to receive the end 94 of the strip 72. The strip 72 may be embedded and secured within the slot 108 on the airfoil 40. In so doing, a forward protrusion of the platform cover 70 of the grounding element 68 may be eliminated when a multi-piece configuration is used for the platform cover 70 and the strip 72.

Turning now to FIGS. 24-27, with continued reference to FIGS. 1-23, instead of using the collar 80 (FIGS. 9 and 10), a sheath 110 may be directly connected to and extend over the grounding element 68. For example, an end 112 of the sheath 110 may overlap and be secured to the tab 78 and the edge 82 of the grounding element 68. The sheath 110 may include a recess 114 to receive tab 78 of the grounding element 68, and the tab 78 may be secured to the recess 114 of the sheath 110. Furthermore, the tab 78 may be preloaded or biased toward the sheath 110 to enhance contact and ensure conductivity between components. In addition to being bonded to the body 42 of the airfoil 40, the sheath 110 may be bonded to the grounding element 68, such as, via a conductive bonding agent or other adhesive.

Figure 28:
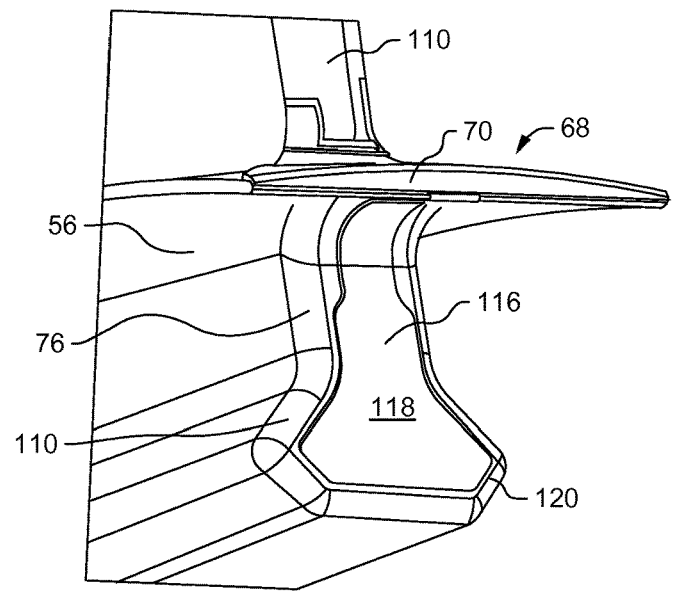
FIGS. 28 and 29 are perspective views of a grounding element including a strip with a dovetail section, according to another embodiment.
Figure 29:
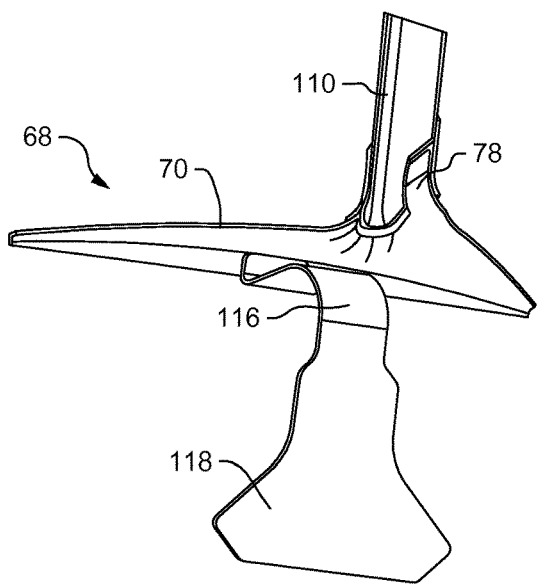

Referring now to FIGS. 28 and 29, with continued reference to FIGS. 1-27, a strip 116 may have a dovetail section 118. The strip 116 may not have a dovetail cap 98 (FIGS. 16-18) that fits over the entire leading edge 76 of the root. Instead, the dovetail section 118 of the strip 116 may have a similar shape as the dovetail portion 100 of the leading edge 76 of the root 56 and may fit inside a perimeter 120 of the leading edge 76. The dovetail section 118 may be shaped to maximize a bond area of the strip 116 with the leading edge 76 of the root 56, which may lead to improved conductivity of the ground path.

Figure 30:
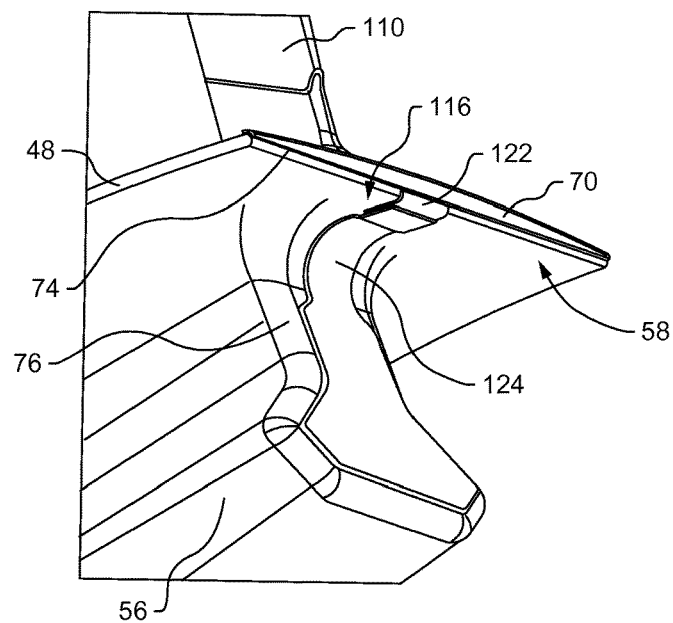
FIGS. 30 and 31 are perspective views of a grounding element including a multi-piece configuration for a strip, according to another embodiment.
Figure 31:
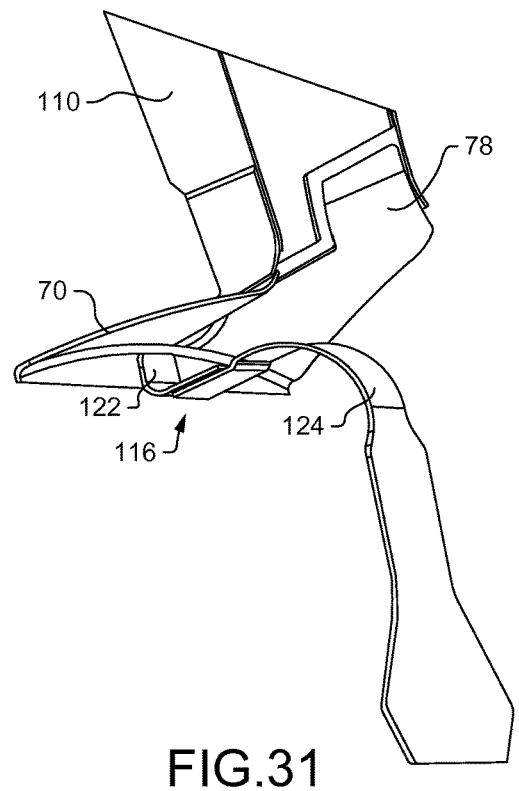

Referring now to FIGS. 30 and 31, with continued reference to FIGS. 1-29, the strip 116 may comprise a multi-piece configuration including a first piece 122 and a second piece 124. In this embodiment, the first piece 122 may extend from the leading edge 74 of the platform 48 to the under side 58 of the platform 48, and the second piece 124 may extend from the under side 58 of the platform 48 to the leading edge 76 of the root 56. Embedded in the slot 108 of the leading edge 74 of the platform 48, the first piece 122 may connect the platform cover 70 to the second piece 124. In so doing, there may be improved formation of under-platform bends in the grounding element 68. In addition, the multi-piece configuration may ensure electrical conductivity and eliminate tolerances issues through improved sealing and alignment when the parts are assembled.

Figure 32:
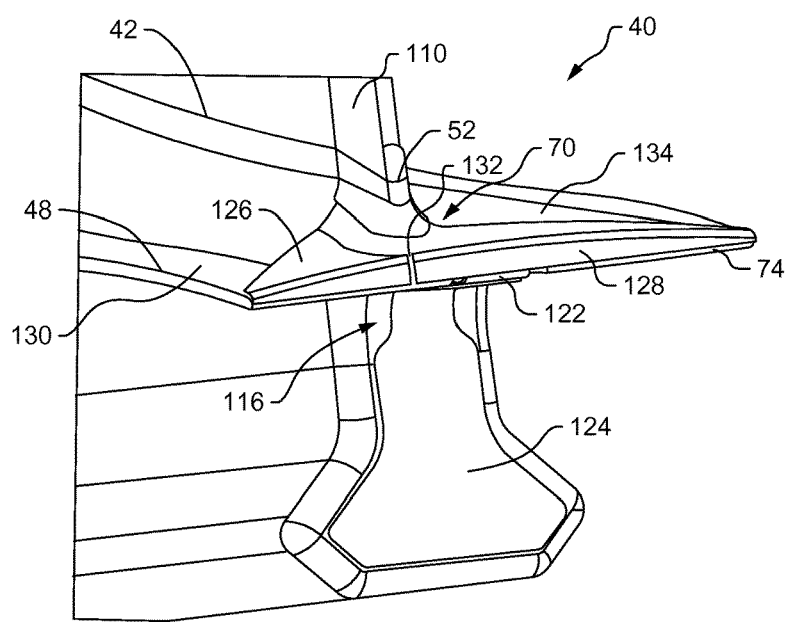
FIGS. 32-34 are perspective view of a grounding element including a multi-piece configuration for a platform cover, according to another embodiment.
Figure 33:
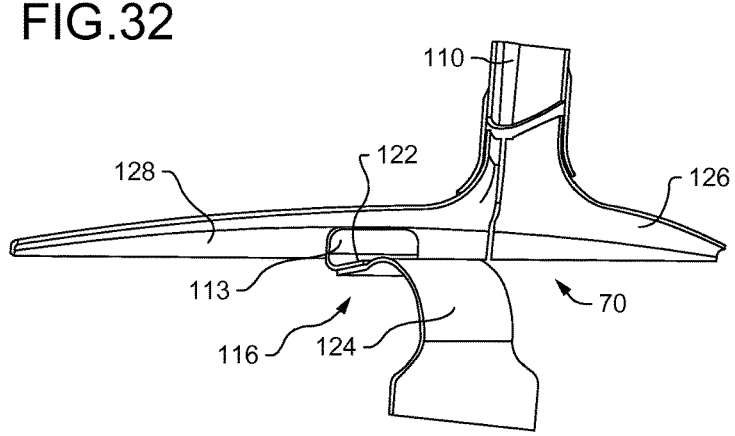
Figure 34:
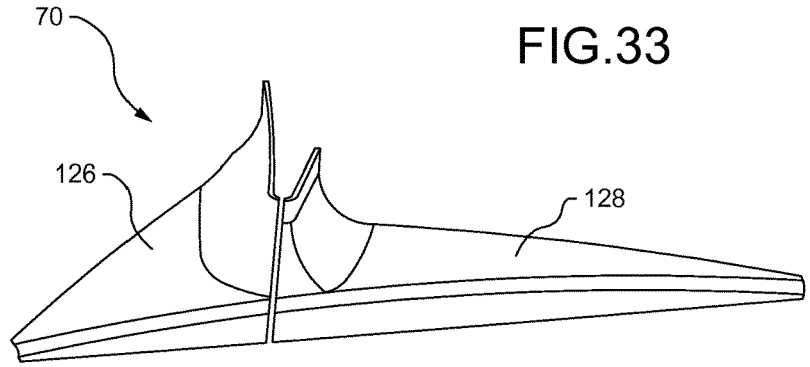

Turning now to FIGS. 32-34, the platform cover 70 may comprise a multi-piece configuration including a first piece 126 and a second piece 128. The first piece 126 may extend circumferentially from a first side 130 of the platform 48 (and a first side 44 of the airfoil 40) proximate to a centerline 132 of the platform 48. The second piece 128 may extend circumferentially proximate the centerline 132 of platform 48 to a second side 134 of the platform 48 (and a second side 46 of the airfoil 40). In addition, the sheath 110 may overlap both the first piece 126 and the second piece 128 of the platform cover 70.

The centerline 132 may follow a camber of the airfoil 40 to the leading edge 74 of the platform 48 and may be disposed on a center of the leading edge 52 of the body 42 of the airfoil 40. However, the centerline 132 may be located anywhere between the first side 130 and second side 134 of the platform 48. The second piece 128 of the platform cover 70 may extend over an end 136 of the first piece 122 of the strip 116, although in other configurations, the first piece 126 (or both pieces 126, 128) of the platform cover 70 may cover the end 136 of the first piece 122 of the strip 116.

Figure 35:
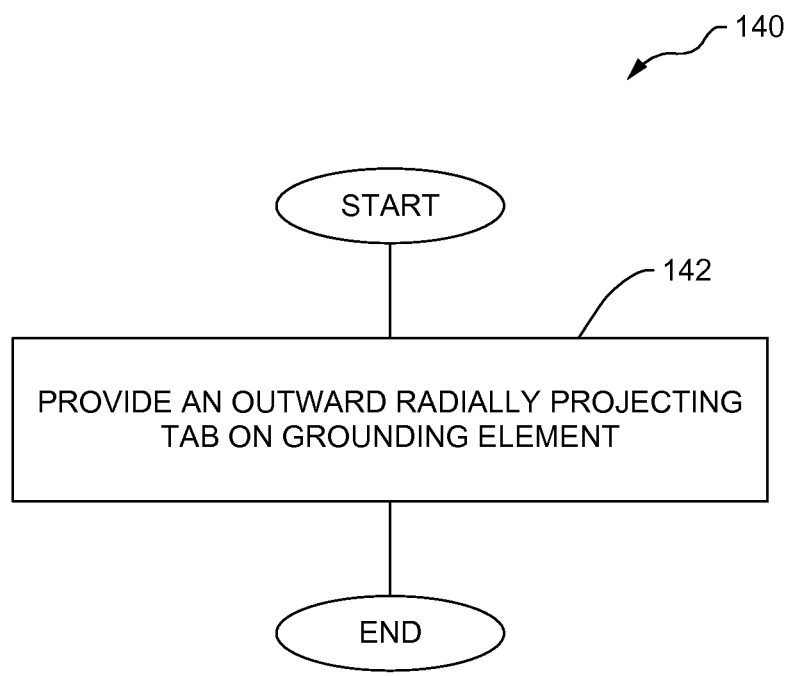
FIG. 35 is a flowchart outlining a process for increasing a connectivity between a sheath and a grounding element of the airfoil, according to another embodiment.

Turning now to FIG. 35, with continued reference to FIGS. 1-34, a flowchart outlining a process 140 for increasing the connectivity between the sheath and the grounding element of the airfoil is shown. The process 142 may comprise providing a tab on the grounding element of the airfoil. The tab may project radially outward from the platform of the airfoil to a predetermined height along a side of the airfoil.

Although various features are disclosed in relation to specific embodiments, it is understood that the various features may be combined with each other, or used alone, with any of the various embodiments disclosed.

INDUSTRIAL APPLICABILITY

From the foregoing, it can be seen that the teachings of this disclosure can find industrial application in any number of different situations, including but not limited to, gas turbine engines. Such engines may be used, for example, on aircraft for generating thrust, or in land, marine, or aircraft applications for generating power.

The present disclosure provides various configurations of a grounding element for an airfoil of a gas turbine engine. The disclosed configurations maintain positive contact between a leading edge sheath and a root of the airfoil. With the root of the airfoil contained within a rotor of the gas turbine engine, static electricity is discharged to the root, thereby minimizing or eliminating galvanic corrosion.

Furthermore, the disclosed configurations maintain a high level of electrical conductivity in the ground path from the leading edge sheath to the root by more effectively sealing a joint between the leading edge sheath and the grounding element. More specifically, a radially projecting tab on the grounding element ensures connection either directly with the sheath or to a collar which connects the sheath to the grounding element. The tab of the grounding element may provide more surface area for contact with the sheath or collar, thereby eliminating or minimizing any crevices between the sheath and the grounding element with and without the collar.

Moreover, the tab may be preloaded toward the sheath or the collar to enhance contact and conductivity between components. In addition, a multi-piece configuration for the grounding element may eliminate tolerance issues when the parts are assembled and improve sealing and alignment of the grounding element on the airfoil. Thus, by minimizing crevices between the sheath and the grounding element, the disclosed configurations provide a robust ground path from the sheath to the rotor, while also preventing ingress of water, in order to drastically reduce galvanic corrosion.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed, but rather includes all embodiments and equivalents encompassed within the claims appended hereto as well.

What is claimed is:

1. An airfoil for a gas turbine engine, comprising:
   a first side and an opposite second side extending radially outward from a platform to a tip;
   a leading edge;
   a sheath on the leading edge;
   a root extending radially inward from the platform, the grounding element being disposed on the platform and extending radially inward from the platform to the root, the tab projecting radially outward from the platform; and a grounding element connected to the sheath, having a radially extending tab, and configured for connection to a component of the gas turbine engine to form a ground path from the sheath to the component.

2. The airfoil of claim 1, further comprising a collar overlapping the sheath and the tab of the grounding element.

3. The airfoil of claim 2, wherein the tab is preloaded toward the collar.

4. The airfoil of claim 1, wherein the sheath overlaps the tab of the grounding element.

5. The airfoil of claim 1, wherein the grounding element includes a platform cover disposed on a leading edge of the platform, and a strip extending from the platform cover to the root.

6. The airfoil of claim 1, wherein the root includes a gradual bend from an under side of the platform to the root in order to enhance manufacturability of the strip.

7. The airfoil of claim 1, wherein the strip extends along a length of a leading edge of the root.

8. The airfoil of claim 1, wherein the platform cover and the strip comprise a multi-piece configuration.

9. The airfoil of claim 8, wherein the platform cover includes a slot configured to receive an end of the strip.

10. The airfoil of claim 8, wherein the platform of the airfoil includes a slot configured to receive an end of the strip.

11. The airfoil of claim 8, wherein the grounding element further includes a dovetail cap extending from the strip and sized to cover a dovetail portion of a leading edge of the root.

12. The airfoil of claim 11, wherein the dovetail portion of the leading edge of the root is shaped to fit within the dovetail cap.

13. The airfoil of claim 11, wherein the platform cover, the strip, and the dovetail cap comprise a three-piece configuration.

14. The airfoil of claim 8, wherein the strip includes a multi-piece configuration including a first piece extending from the leading edge of the platform to an under side of the platform, and a second piece extending from the under side of the platform to the root.

15. The airfoil of claim 14, wherein the platform cover includes a multi-piece configuration including a first piece extending circumferentially from a first side of the platform proximate to a centerline of the platform, and a second piece extending circumferentially proximate the centerline of the platform to a second side of the platform.

16. An assembly for a gas turbine engine, comprising:
a fan section;
a compressor section downstream of the fan section;
a combustor section downstream of the compressor section; and
a turbine section downstream of the combustor section, at least one of the fan section, the compressor section, and the turbine section having an airfoil including:
a first side and an opposite second side extending radially outward from a platform to a tip;
a sheath disposed on a leading edge of the airfoil;
a root extending radially inward from the platform; and
a grounding element disposed on a platform of the airfoil and extending radially inward from the platform to the root of the airfoil, the grounding element including a tab projecting radially outward from the platform, the grounding element and the sheath being connected to form a ground path from the sheath to a rotor in the at least one of the fan section, the compressor section, and the turbine section.

17. The assembly of claim 16, wherein a collar connects the grounding element to the sheath.

18. A method for increasing connectivity between a sheath and a grounding element of an airfoil, the airfoil having a first side and an opposite second side extending radially outward from a platform to a tip;
a root extending radially inward from the platform, the grounding element being disposed on the platform and extending radially inward from the platform to the root, the tab projecting radially outward from the platform, the method comprising:
connecting the sheath of the airfoil to a tab on the grounding element of the airfoil, the tab projecting radially outward from a platform of the airfoil to a predetermined height along a side of the airfoil.

19. The method of claim 18, further comprising adhering the sheath on top of the tab.

* * * * *